United States Patent [19]

Ido et al.

[11] Patent Number: 4,606,971

[45] Date of Patent: Aug. 19, 1986

[54] MAGNETIC RECORDING MEDIUM

[75] Inventors: Tadashi Ido, Ebina; Osamu Kubo, Yokohama; Masahiro Fukasawa, Tokyo; Tatsumi Maeda, Kawasaki; Tutomu Nomura, Yokohama, all of Japan

[73] Assignee: Kabushiki Kaisha Toshiba, Kawasaki, Japan

[21] Appl. No.: 639,317

[22] Filed: Aug. 10, 1984

[30] Foreign Application Priority Data

Aug. 19, 1983 [JP] Japan ................................ 58-150157

[51] Int. Cl.[4] .............................................. G11B 5/70
[52] U.S. Cl. .................................. 428/328; 252/62.54; 252/62.56; 252/62.57; 252/62.58; 252/62.59; 252/62.63; 427/128; 360/134; 360/135; 360/136; 428/329; 428/694; 428/900
[58] Field of Search ........................ 427/132, 131, 128; 428/329, 328, 694, 900; 252/62.57, 62.58, 62.59, 62.63, 62.56; 360/134–136

[56] References Cited

U.S. PATENT DOCUMENTS

| 3,023,166 | 2/1962 | Duinker | 427/132 |
| 4,341,648 | 7/1982 | Kubo et al. | 252/62.63 |
| 4,414,124 | 11/1983 | Endo et al. | 252/62.63 |
| 4,425,401 | 1/1984 | Ido | 428/330 |
| 4,442,159 | 4/1984 | Dezawa | 428/694 |
| 4,496,626 | 1/1985 | Kasuga | 428/695 |

FOREIGN PATENT DOCUMENTS

| 86103 | 6/1980 | Japan | 427/132 |
| 56-169128 | 12/1981 | Japan . | |
| 58-6526 | 1/1983 | Japan . | |

OTHER PUBLICATIONS

Kubo, O., T. Ido and H. Yokoyama, "Properties of Ba Ferrite Particles for Perpendicular Magnetic Recording Media", IEEE Mag-18, 1122 (1982).

Primary Examiner—Ellis P. Robinson
Attorney, Agent, or Firm—Schwartz, Jeffery, Schwaab, Mack, Blumenthal & Evans

[57] ABSTRACT

Disclosed is a magnetic recording medium comprised of a substrate and a layer of magnetic powder coated on a surface of the substrate, characterized in that the magnetic powder is hexagonal crystals having single domain crystalline magnetic anisotropy, particle sizes of 0.01 to 0.3 μm, particle size/thickness ratios of 2.3 to 15 and the tapping packing rate of said magnetic powder is 15% or more.

8 Claims, 2 Drawing Figures

MAGNETIC RECORDING MEDIUM

BACKGROUND OF THE INVENTION

This invention relates to a magnetic recording medium, and more specifically to a magnetic recording medium which permits high-density recording.

A magnetic recording medium is fabricated, for example, by coating a magnetic coating formulation, which has been formed by dispersing desired magnetic powder together with a dispersant such as stearic acid in a resinous binder such as a polylvinyl chloride or a polyvinyl acetate for instance, on a surface of a substrate made for example of polyethylene terephthalate (PET) resin to form a layer of the magnetic powder.

Upon fabrication of such a magnetic recording medium, it has heretofore been usual to have the magnetic powder consisting of acicular crystals such as $\gamma$-$Fe_2O_3$ or $CrO_2$ oriented in the in-plane longitudinal direction of the recording medium so that the remanent magnetization in the in-plane longitudinal direction may be used for magnetic recording and reproduction. This recording and reproducing system is however accompanied by a drawback that the demagnetizing field tends to be increased in the magnetic recording medium as the recording density becomes higher and the recording and reproducing performance becomes poorer especially in the short wavelength range. In order to overcome this demagnetizing field and to conduct high-density recordings, it is necessary to increase the coersive force of a recording medium and at the same time, to make its magnetic recording layer thinner. Under the circumstances, however, it is difficult to enhance the coersive force of a magnetic recording layer. It is on the other hand undesirable to make its magnetic recording layer thinner due to imminent problems such as reduction in characteristics of reproduced signals. Consequently, it is difficult to achieve high densification of magnetic recording in accordance with the above-mentioned conventional method in which acicular magnetic powder is caused to orient in the in-plane longitudinal direction so as to utilize the remanent magnetization in the same direction.

With a view toward solving the above-described problem it was also proposed to use the remanent magnetization in a direction perpendicular to the plane of a magnetic recording medium. In such a perpendicular magnetization and recording system, it is required that each particle of magnetic powder, which is to be used, has an easy axis of magnetization in a direction perpendicular to the surface of the recording medium. As magnetic media making use of the perpendicular magnetization and recording system, the following recording media have been proposed to date.

One example of such recording media has a Co-Cr alloy film formed on a surface of a substrate in accordance with the sputtering technique (S. Iwasaki and K. Ouchi, "Co-Cr recording films with perpendicular magnetic anisotropy" IEEE Trans. Magn., MAG-14,5 (1978) 849). Such a recording medium was however unsuitable for actual application, because it is accompanied by such drawbacks that both recording medium and magnetic head undergo considerable wearing upon sliding contact of the Co-Cr alloy film and magnetic head, the magnetic medium has by itself poor flexibility and is hence difficult to handle, and its productivity of manufacturing is low.

With the foregoing in view, the present inventors have already proposed a recording medium of the perpendicular magnetization system which recording medium makes use of hexagonal ferrite powder having hexagonal single domain crystalline magnetic anisotropy (see, Japanese Unexamined Patent Publication No. 61101/1981). A microscopic observation indicated that the magnetic powder used in the above recording medium was formed of hexagonal blocks or hexagonal platelets which were hexagonal in plan and had certain thickness. Each of the hexagonal blocks or hexagonal platelets has an easy axis of magnetization in a direction perpendicular to its hexagonal plane.

A magnetic recording medium making use of such magnetic powder permits recording at a density significantly higher than conventional magnetic recording medium.

There is, however, a strong demand for the development of a magnetic recording medium which permits recording of a still higher density in order to cope with the recent increase in the volume of information to be recorded.

SUMMARY OF THE INVENTION

An object of this invention is to provide a magnetic recording medium which has been improved further over the above-described magnetic recording medium proposed by the present inventors and thus permits recording of a still higher density.

The present inventors have carried out, with a view toward attaining the above object, a detailed investigation with respect to the shapes of various magnetic powder having hexagonal single domain crystalline magnetic anisotropy. As a result, it has been found that still better high-density recording becomes feasible where hexagonal blocks or hexagonal platelets, which make up magnetic powder, have certain specific dimensions and shapes, leading to the development of a magnetic recording medium of this invention.

Accordingly, the present invention provides a magnetic recording medium formed of a substrate and a layer of magnetic powder coated on a surface of the substrate, characterized in that the magnetic powder is hexagonal crystals having single domain crystalline magnetic anisotropy, particle sizes of 0.01 to 0.3 $\mu$m, particle size/thicknes ratios of 2.3 to 15 and the tapping packing rate of said magnetic powder is 15% or more.

DETAILED DESCRIPTION OF PREFERRED EMBODIMENTS

Figure 1:
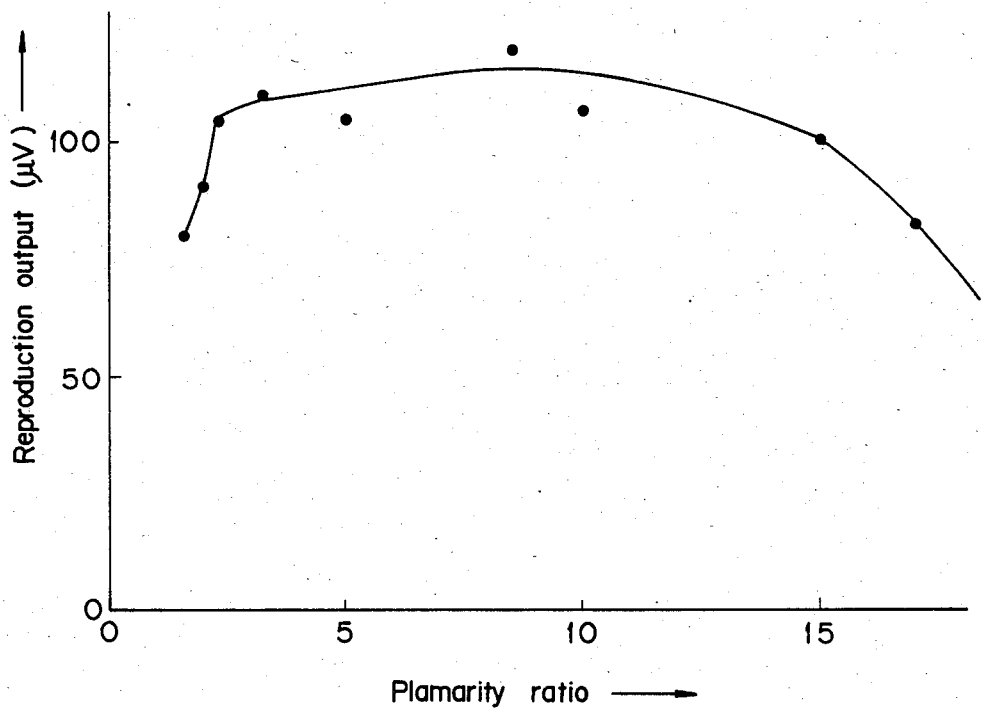
FIG. 1 is a diagram showing the relationship between the particle size/thickness ratio, namely, the planarity ratio of magnetic powder and the reproduction output in the magnetic tape specimens fabricated in the Example 1.

As the material of the substrate employed in the magnetic recording medium of this invention, any materials may be used so long as they have been used for the same purpose in conventional magnetic recording medium. A variety of resinous sheets such as polyester film may be mentioned.

The magnetic powder, which is used in the magnetic recording medium of this invention, has hexagonal single domain crystalline magnetic anisotropy. Materials that can be used in the present invention for the magnetic powders, include Co, and Fe- or Ni-containing Co alloys; Mn-Bi alloys; Mn-Al alloys; alloys represented by the formulas $RCo_5$ and $R_2Co_{17}$, Wherein R denotes a rare earth element and Co denotes a cobalt atom and/or hexagonal ferrites containing Ba, Sr, Pb, Ca; and substituted hexagonal ferrites, in each of which a portion of Fe has been substituted by at least one element selected from the group consisting of Co, Ti, Ni, Mn, Cu, Zn, In, Ga, Nb, Zr, V and Al. Among these magnetic powders, the substituted hexagonal ferrites may be suitably employed in the practice of this invention. In addition, magnetic powders having coersive forces in the range of 200 to 2000 Oe are useful for high-density recording.

Each magnetic powder consists of magnetic particles, each of which has a particle size of 0.01 to 0.3 μm, preferably of 0.03 to 0.2 μm and a particle size/thickness ratio of 2.3 to 15, preferably of 2.8 to 5.

The term "particle size" as used herein means the maximum value of inter-corner distances in the hexagonal plane of each hexagonal block or platelet. On the other hand, by the term "thickness" as used herein is meant either height or thickness of the block or platelet.

The saturation magnetization (ρg: emu/g) will not be sufficiently large if the particle size is smaller than 0.01 μm. If the particle size exceeds 0.3 μm on the other hand, the resulting magnetic recording medium will not only fail to achieve high-density recording but also produce greater noise upon reproduction. Therefore, it is improper to use particle size outside the above-defined range.

If the particle size/thickness ratio is smaller than 2.3, the output will become lower upon reproducing each record. Such a low ratio does not thus appear to permit high-density recording. If the ratio exceeds 15 on the other hand, particles of magnetic powder will have extremely thin shapes to have thickness of as thin as about 200 angstroms, leading to a reduction to the saturation magnetization which governs the reproduction output significatnly. Furthermore, the particles of such magnetic powder will be susceptible of undergoing breakage due to their small thickness when dispering them in a resinous binder to prepare a magnetic coating formulation.

The tapping packing rate is a rate percentage obtained by dividing a weight (w) of a powder contained in a long cylindrical glass-made container by a volume (v) of the powder obtained after the container was made to fall from a height of 4 cm and by further dividing the thus obtained value (w/v) by the true density (d) of the powder. Namely, the tapping packing rate may be expressed by the following equation:

Tapping packing rate $(\%) = w/v \times 1/d \times 100(\%)$.

Greater values of the tapping packing rate indicate better packing of powders, corresponding to higher uniformity of particle shapes, less void among the particles, and a sharp particle size distribution curve.

On the other hand, coating-type magnetic recording medium is manufactured by dispersing magnetic particles uniformly in a binder and coating the resulting formulation on a substrate film.

Magnetic powder with a greater tapping packing density shows a greater packing density also in a magnetic recording medium, which permits attaining the greater magnetization of the magnetic medium involved in the output, one of the electro-magnetic transducing characteristics, and is desirable as a magnetic medium.

In cases where the tapping packing rate is lower than 15%, the strong cohesion of magnetic particles is recognized and at the same time the signal-to-noise ratio (S/N) is small when the particles are formed into a magnetic medium.

On the other hand, when the tapping packing rate is not lower than 15%, the magnetic particles are more separated from one another and a high signal-to-noise ratio can be obtained, when the particles are formed into a magnetic medium.

Magnetic powder useful in the practice of this invention may be prepared, for example, by the glass crystallization method disclosed in Japanese Unexamined Patent Publication No. 67904/1981 or the co-precipitation method disclosed in Japanese Unexamined Patent Publication No. 160328/1981.

The recording medium of this inventio may be fabricated readily by dispersing the above-described magnetic powder together with a dispersant in a known resinous binder such as homo-polymerizates and co-polymerizates of polyvinyl derivatives, polyurethanes, polyesters and the like to prepare a magnetic coating formulation and then applying the magnetic coating formulation on a surface of a substrate. In the course of the above fabrication process, more specifically, after the application of the magnetic coating formulation, it is effective to apply a prescribed magnetic field to the resultant coated substrate because the magnetic field can enhance the orientation of the magnetic powder.

EXAMPLE 1

There were provided nine types of Co-Ti substituted Ba ferrite powders, which were respectively of the specification given in the following Table.

TABLE 1

| | Characteristics in shape | | Saturation magnetization $\sigma g$ (emu/g) | Coersive force Hc(Oe) | Tapping packing rate (%) |
|---|---|---|---|---|---|
| | Particle size (μm) | Particle size/ thickness ratio | | | |
| Sample 1 | 0.07 | 1.8 | 59 | 890 | 18 |
| Sample 2 | 0.08 | 2.0 | 59 | 800 | 19 |
| Sample 3 | 0.08 | 2.3 | 58 | 850 | 18 |
| Sample 4 | 0.09 | 3.4 | 58 | 880 | 20 |
| Sample 5 | 0.08 | 5.0 | 58 | 800 | 18 |
| Sample 6 | 0.08 | 8.5 | 58 | 850 | 18 |
| Sample 7 | 0.09 | 10 | 56 | 830 | 16 |
| Sample 8 | 0.08 | 15 | 53 | 850 | 16 |
| Sample 9 | 0.09 | 17 | 43 | 800 | 14 |

In the above Table, Samples 3–8 were magnetic powders according to this invention while Sample 1, 2 and 9 were given as comparative examples.

Magnetic coating formulations of the following composition were respectively prepared using the above magnetic powders. They were respectively filtered through 1-μm filters and thenapplied on PET films.

| | Parts by weight |
|---|---|
| Magnetic powder | 100 |
| Copolymer of vinyl chloride - vinyl acetate | 10 |
| Polyurethane | 10 |
| Lecithin | 4 |
| Methyl isobutyl ketone | 93 |

-continued

| | Parts by weight |
|---|---|
| Toluene | 93 |
| Colonate L (trade name; polyisocyanate compound produced by Nippon Polyurethane K.K) | 3 |

Then, a magnetic field of 4000 Oe was applied to each of the thus-coated PET films in a direction perpendicular to the coated surface of the PET film so that the magnetic powder was caused to orient in the magnetic field, followed by drying of the resulting film. The thus-dried PET films were then subjected to calender processing so as to make their surfaces smoothness. Then, they were cut into ½ inch widths to obtain specimens.

These specimens were magnetically recorded and their reproduction outputs were thereafter measured to determine their tape characteristics. The magnetic head, which was used in the above mearsurement, was a ring-shaped ferrite head with a 0.3 μm gap width and 35 μm track width. The relative speed between the head and each tape specimen was 3.75 m/sec., whereas the recording frequency was 4 MHz. Results are shown in the accompanying diagram.

As apparent from FIG. 1, the reproduction output is low and is unstable as evidenced by rapid changes when the particle size/thickness ratio is smaller than 2.3. When the particle size/thickness ratio exceeds 2.3, the reproduction output becomes greater and it undergoes smaller changes, namely, it is stabilized. When the particle size/thickness ratio exceeds 15, however, the reproduction output is lowered due to a reduction to the saturation magnetization of the magnetic powder ($\rho$g) and the resulting magnetic medium will have poor utility.

EXAMPLE 2

There were provided five samples (Samples 1 to 5) of Co-Ti substituted Ba ferrite powders, which had respectively the properties as given in the following Table 2.

TABLE 2

| | Characteristics in shape | | Saturation magnetization $\sigma$g (emu/g) | Coersive force Hc(Oe) | Tapping packing rate (%) |
|---|---|---|---|---|---|
| | Particle size (μm) | Particle size/ thickness ratio | | | |
| Sample 1 | 0.08 | 4.2 | 58 | 880 | 10 |
| Sample 2 | 0.08 | 4.0 | 58 | 850 | 13 |
| Sample 3 | 0.08 | 4.0 | 58 | 870 | 16 |
| Sample 4 | 0.09 | 3.6 | 58 | 870 | 17 |
| Sample 5 | 0.07 | 3.4 | 58 | 880 | 21 |

In the Table above, Samples 3 to 5 were magnetic powders according to the present invention, while Samples 1 and 2 were given as comparative examples.

Coating formulations were prepared, making use of the above samples, respectively from 10 parts by weihgt of vinyl chloride-vinyl acetate polymer, 10 parts by weight of polyurethane, 4 parts by weight of lecithin, 93 parts by weight of isobutyl methyl ketone, 93 parts by weight of toluene, and 3 parts by weight of Colonate L, relative to 100 parts by weight of the respective magnetic powder Samples. Each of the thus obtained formulations was applied on a surface of a polyethylene terephthalate film, and a magnetic field of 4000 Oe was applied to the film in a direction perpendicular to the coated surface of the film, followed by drying the resulting film. The dried film was subjected to calendar processing so as to make its surface smooth, and cut into ½" (inch) width to obtain a specimen.

These specimens were magnetically recorded and their reproduction outputs were thereafter measured to determine their tape charactreristics. The magnetic head, which was used in the above mearsurement, was a ring-shaped ferrite head with a 0.3 μm gap width and 35 μm track width. The relative speed between the head and each tape specimen was 3.75 m/sec., whereas the recording frequency was 4 MHz. Results are shown in FIG. 2.

Figure 2:
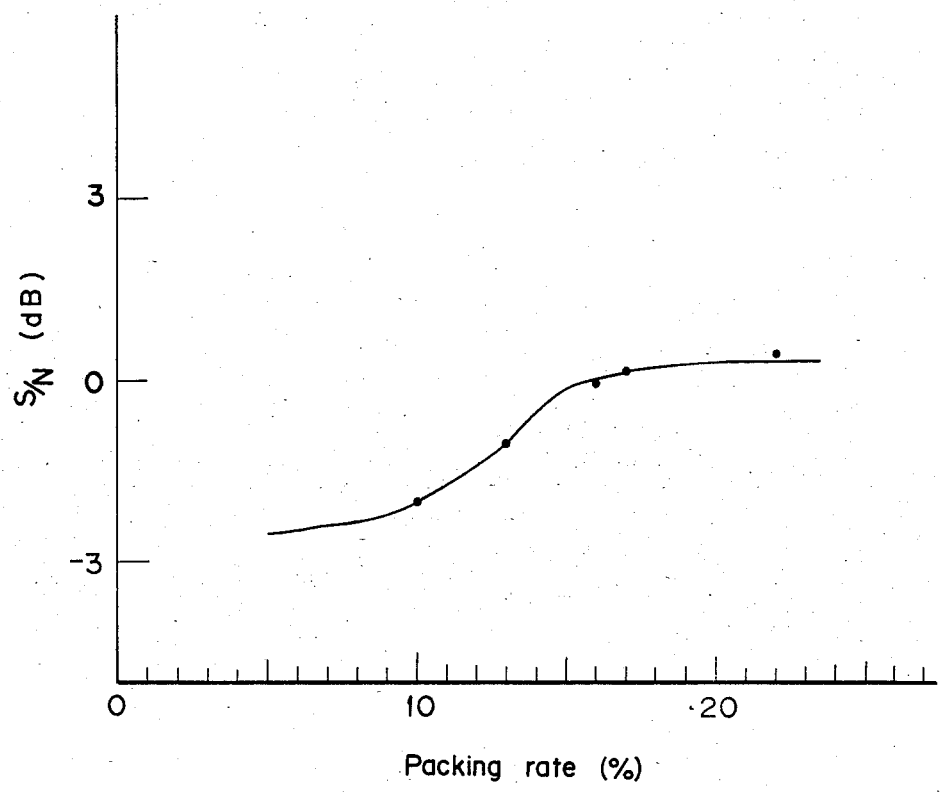
FIG. 2 is a diagram showing the relationship between the tapping packing rate and S/N (ratio of reproduction output to noise) according to Example 2.

As apparent from FIG. 2, S/N or the ratio of reproduction output to noise, is small when the tapping packing rate (percentage) is lower than 15%, while S/N becomes larger and stabilized when it is not lower than 15%.

The magnetic recording medium of this invention is advantageous from the industrial viewpoint, because it permits high-density recording and enjoys a large reproduction output and it may be fabricated by applying a conventional coating method as is.

We claim:

1. A magnetic recording medium comprised of a substrate and a layer of magnetic powder coated on a surface of said substrate, wherein said magnetic powder comprises hexagonal crystals having (a) single domain crystalline magnetic anisotropy, (b) particle sizes of 0.01 to 0.3 μm, and (c) particle size/thickness ratios of 2.3 to 15, the tapping packing rate of said magnetic powder being 15% or more.

2. The magnetic recording medium according to claim 1, wherein the magnetic powder has a coersive force of 200 to 2000 oersteds.

3. The magnetic recording medium according to claim 1, wherein the magnetic powder is hexagonal ferrite powder or substituted hexagonal ferrite powder.

4. The magnetic recording medium according to claim 2, wherein the magnetic powder is hexagonal ferrite powder or substituted hexagonal ferrite powder.

5. The magnetic recording medium according to claim 2, wherein the magnetic powder is comprised of at least one selected from the group consisting of Fe- and Ni-containing Co alloys; Mn-Bi alloys; Mn-Al alloys; and alloys represented by the formulas $RCo_5$ and $R_2Co_{17}$, wherein R denotes a rare earth element and Co denotes a cobalt atom.

6. The magnetic recording medium according to claim 3, wherein the substituted hexagonal ferrite powder comprises powdery hexagonal ferrite the iron of which has been partly substituted with at least one element selected from the group consisting of cobalt, titanium, nickel, manganese, copper, zinc, indium, gallium, niobium, zirconim, vanadium and aluminum.

7. The magnetic recording medium according to claim 1, wherein the particle size of the hexagonal crystals is 0.03 to 0.2 μm.

8. The magnetic recording medium according to claim 1, wherein the particle size/thickness ratio is 2.8 to 5.

* * * * *